(12) United States Patent
Chacko et al.

(10) Patent No.: US 11,177,902 B2
(45) Date of Patent: Nov. 16, 2021

(54) PHYSICAL GATE BASED PREAMBLE OBFUSCATION FOR SECURING WIRELESS COMMUNICATION

(71) Applicant: Drexel University, Philadelphia, PA (US)

(72) Inventors: James J. Chacko, Huntingdon Valley, PA (US); Kapil R. Dandekar, Philadelphia, PA (US); Marko Jacovic, Philadelphia, PA (US); Kyle Joseph Juretus, Quakertown, PA (US); Nagarajan Kandasamy, Philadelphia, PA (US); Cem Sahin, Peoria, AZ (US); Ioannis Savidis, Wallingford, PA (US)

(73) Assignee: Drexel University, Philadelphia, PA (US)

( * ) Notice: Subject to any disclaimer, the term of this patent is extended or adjusted under 35 U.S.C. 154(b) by 110 days.

(21) Appl. No.: 16/478,148

(22) PCT Filed: Jan. 15, 2018

(86) PCT No.: PCT/US2018/013728
§ 371 (c)(1),
(2) Date: Jul. 16, 2019

(87) PCT Pub. No.: WO2018/132796
PCT Pub. Date: Jul. 19, 2018

(65) Prior Publication Data
US 2019/0373463 A1 Dec. 5, 2019

Related U.S. Application Data

(60) Provisional application No. 62/446,727, filed on Jan. 16, 2017.

(51) Int. Cl.
*H04L 9/08* (2006.01)
*H04K 1/00* (2006.01)
(Continued)

(52) U.S. Cl.
CPC ............... *H04K 1/00* (2013.01); *H04L 9/088* (2013.01); *H04W 12/03* (2021.01); *H04W 12/037* (2021.01); *H04W 12/041* (2021.01)

(58) Field of Classification Search
CPC ... H04L 9/088; H04L 9/06; H04L 9/08; H04L 9/32; H04W 12/02; H04W 12/04; H04K 1/00
See application file for complete search history.

(56) References Cited

U.S. PATENT DOCUMENTS 7,106,803 B1  9/2006  Hsu
7,489,722 B2  2/2009  Denk
(Continued)

FOREIGN PATENT DOCUMENTS

| EP | 1710968 A1 | 10/2006 |
|---|---|---|
| WO | 2016160546 A1 | 10/2016 |
| WO | 2018/132796 A1 | 7/2018 |

OTHER PUBLICATIONS

Apirath Limmanee, Secure Physical-layer Key Generation Protocol and Key Encoding in Wireless Communications, IEEE Globecom, USA.
(Continued)

*Primary Examiner* — Vu V Tran
(74) *Attorney, Agent, or Firm* — Schott, P.C.

(57) ABSTRACT

A physical layer based technique secures wireless communication between a transmitter and receiver. The technique involves obfuscating the preamble data of the baseband signal through unique keys that are generated at the transmitter and the receiver based on channel characteristics known only to them.

15 Claims, 5 Drawing Sheets

(51) Int. Cl.
*H04W 12/03* (2021.01)
*H04W 12/037* (2021.01)
*H04W 12/041* (2021.01)

(56) References Cited

U.S. PATENT DOCUMENTS

| | | | |
|---|---|---|---|
| 8,457,175 | B2 | 6/2013 | Hardacker et al. |
| 8,792,640 | B2 | 7/2014 | Kawasaki et al. |
| 9,008,208 | B2 | 4/2015 | Khandani |
| 2004/0180694 | A1* | 9/2004 | Lai .................. H04M 1/66 455/558 |
| 2007/0058808 | A1 | 3/2007 | Rudolf et al. |
| 2011/0026714 | A1 | 2/2011 | Thomas et al. |
| 2011/0033051 | A1* | 2/2011 | Steer ................. H04K 3/25 380/270 |
| 2012/0008547 | A1* | 1/2012 | Yokoyama .......... H04B 7/155 370/315 |
| 2012/0237036 | A1* | 9/2012 | Dabak ............... H05K 5/0278 380/287 |
| 2014/0195807 | A1* | 7/2014 | Bar-El .............. H04L 9/083 713/168 |
| 2015/0023503 | A1* | 1/2015 | Baek ................ H04W 12/041 380/270 |
| 2015/0146872 | A1 | 5/2015 | Baek et al. |

OTHER PUBLICATIONS

Jizhong Zhao, Efficient and Secure Key Extraction using CSI without Chasing down Errors, INFOCOM, Aug. 2012, USA.
International Search Report and Written Opinion received for PCT Application No. PCT/US2018/013728, dated May 2, 2018, 10 pages.

* cited by examiner

PHYSICAL GATE BASED PREAMBLE OBFUSCATION FOR SECURING WIRELESS COMMUNICATION

STATEMENT REGARDING GOVERNMENT SUPPORT

This invention was made with government support under Contract No. CNS-1228847 and DUE 1241631 awarded by the National Science Foundation. The government has certain rights in the invention.

BACKGROUND

Securing wireless transmissions by manipulating the physical layer is an increasing area of interest because malicious attackers may easily execute attacks such as spoofing, de-authentication, and cracking encryption keys due to availability of software tools. Attackers, using eavesdroppers, may exploit idiosyncratic design and spectral characteristics of a channel between a transmitter and receiver that generate secret keys. But an attacker is still capable of detecting packets that are secured within the medium due to the strict structure of the packets used in the communication protocol. The capability of detecting transmissions may allow for reactive attacks that cause partial or full distortion of packets traversing the medium. To address the problem of eavesdropping hacking, some solutions rely on the physical layer to maintain integrity in communications.

A. Physical Key Obfuscation

Integrated circuits (ICs) may use physical keys to withhold detailed information regarding the design flow from untrusted third-parties. Concealing such information is a protection mechanism against the threats of intellectual property (IP) theft, IC counterfeiting and overproduction, and the insertion of malicious hardware (such as hardware Trojans) into an IC. There are various methods for implementing physical key obfuscation, including the XOR and gate level logic encryption methodologies described herein.

1) XOR-based Logic Encryption: XOR based logic encryption uses an XOR gate 100 at the output of a gate already present in the circuit to corrupt the output of the original gate if an incorrect key is used. An example is shown in FIG. 2a, where KEY 0 controls the corruption on the net labeled OUT0. When KEY 0 is 0, the XOR gate 200 behaves as a buffer, and the functionality of the NAND gate 210 is seen at OUT0. If KEY 0 is set to 1, then the XOR gate 200 acts as an inverter resulting in OUT0 to behave like an AND gate.

Inverters added before or after an original gate may obfuscate the value of a key to prevent an adversary from knowing the key value solely on the use of the XOR/XNOR gate. Requiring the original gate and the XOR gate for encryption introduces a large per-gate overhead of approximately 140% in propagation delay, 85% increase in power, and 125% area overhead when compared to a standard cell with no encryption.

2) Gate Level Logic Encryption: Gate level logic encryption introduces key based security into the gate design itself in order to reduce the per-gate overhead required to implement XOR-based encryption. FIG. 3 shows an implementation of the XOR based encryption of a NAND with gate level logic encryption. The transmission gate design then physically replaces the NAND gate 210, removing the need for both the NAND gate 210 and the XOR gate 200. Removing the original gate leaves less information of the original design, and reduces the overhead needed to encrypt a design. For example, the NAND gate encrypted in FIG. 2A may now be implemented by setting KEY 0 to 1 and KEY 1 to 0.

Referring to FIG. 3, the KEY0 input is connected to transmission gate 1 310 and transmission gate 2 320, which are in parallel and additionally have inputs A, A_BAR and B, B_BAR respectively. The KEY1 input is connected to transmission gate 3 330 and transmission gate 4 340, which are in series and additionally have inputs A, A_BAR and B, B_BAR respectively. The output of the parallel gates 310, 320 and series gates 330, 340 are connected to a single output OUT. The Truth Table 350 captures the output OUT based on various inputs at KEY0, KEY1, A, and B.

Using gate level logic encryption results in an approximately 23% reduction in propagation delay through the circuit, 29% reduction in power consumption, and 19.8% less area usage compared to XOR-based logic encryption.

B. Channel Spectrum Based Key Generation

Various encryption methods are available both at higher layers of the network stack and at the Physical (PHY) layer. One encryption technique generates a pair of public and private keys that leverage computationally hard problems to solve. Although the algorithm offers a solution for not sharing the decryption key with the public, the asymmetric nature of RSA cryptography disqualifies the key generation algorithm from the application defined herein. The logic gates, as described above, require symmetric keys established on both ends of the communication channel. Symmetric key encryption techniques, such as the Advanced Encryption Standard (AES) require additional steps to agree on a secret key. Possible steps include a key management server, pre-shared keys, and/or nonces, salts, or initialization vectors transmitted between the two parties during the key agreement phase. The information transmitted over an unsecured channel during the key agreement phase leaves the communication link vulnerable to eavesdropping attacks. Physical layer techniques leverage the randomness extracted from the wireless channel to generate a symmetric secret key minimizing any information leaked in plain-text.

SUMMARY OF THE EMBODIMENTS

The physical layer hardware encryption technique described herein defends against intruders attempting to reactively attack by masking the channel from detection.

The technique seeks to prevent intruders using standard compliant radio transceivers from performing narrow band reactive jamming and eavesdropping based attacks. An attacker with unlimited power, memory and time may capture every transmission over the air and then post process the data to sync unto the transmitted packet but the obfuscation performed herein will significantly compromise the consecutive steps in decoding that involve training on known data. The intended receiver is designed to retrieve the original preamble data from the received signal to sync and decode the packet.

The use of a physical layer based technique provides an extra layer of security that complements traditional approaches. Design changes required for implementation of the techniques require additional overhead in comparison to standard approaches; however, the technique described uses minimal additional hardware resources. Unique signatures, or secret keys, are derived through the analysis of channel or other communication link measurements and are engineered into the transmitted signal.

A communications network comprising a mobile station that transmits a signal comprises a payload to be transmitted; a pilot module that adds a pilot signal to the payload to create a signal to be transmitted; an obfuscation module that encrypts the preamble with an obfuscation key to create an obfuscated preamble/payload packet; and an antenna that transmits the obfuscated preamble/payload packet.

DETAILED DESCRIPTION OF THE EMBODIMENTS

Introduction

Telecommunication standards bodies propose wireless communication standards that differ in implementation and are selected based on the type of coverage, throughput, and desired service goals. Commercial devices working within each standard share the same medium and communicate based on a defined set of policies that is described within the header structure of each packet. The standards set forth a strict packet structure defined by the protocol. This structure ensures reliable communication between two parties, but this standardization may be exploited by intruders. Intruders may use man-in-the-middle attacks such as eavesdropping, spoofing, and denial-of-service related to reactive signal jamming.

Specifically, one past method uses a technique in which an adversary launches a low-power reactive jamming attack to distort data used in frequency offset estimation. Alternatively, an energized narrow-band based reactive jamming framework may generate an energy pulse that disrupts the reception of data upon detecting the packet preamble. Both attacks depend on exploiting the strict structure of a packet.

The system and method herein may secure the wireless communication channel through obfuscating the physical layer at the gate level logic by using unique keys that are generated individually at both communication nodes based on reciprocal channel characteristics. This system and method may provide flexibility in obfuscating the physical layer based on runtime data on the SDC testbed and the ability to apply an overlaying security layer for point-to-point communication on demand.

Physical Key Based Wireless Preamble Encryption

A. Hardware

Figure 1A:
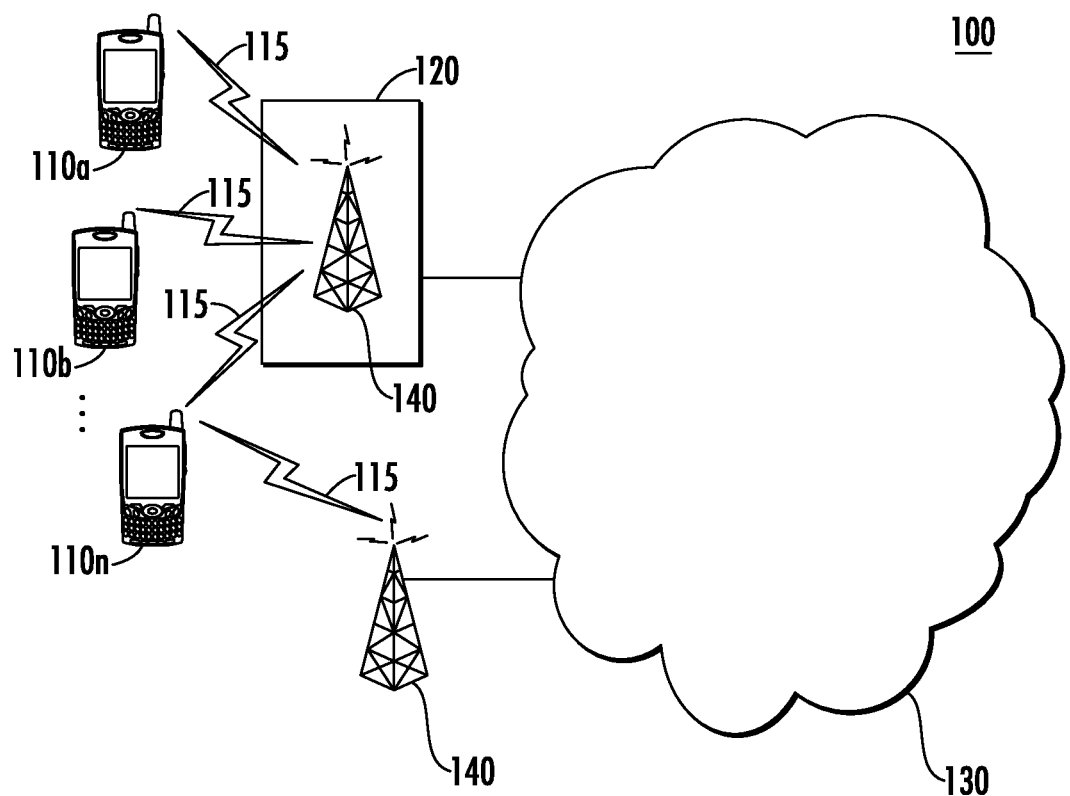
FIGS. 1A and 1B show hardware systems implementing the encryption systems and methods.

FIG. 1A is an overview of a communications network 100 that may include the system and method described herein. The communications network 100 may share voice, data, video, messaging, broadcast, etc., to multiple nodes in the network, which may be wired or wirelessly connected. The communications network 100 may use any one of certain channel access methods, such as Frequency-division multiple access (FDMA), Time division multiple access (TDMA), Code division multiple access (CDMA), Spread spectrum multiple access (SSMA), Space division multiple access (SDMA), Power division multiple access (PDMA), and the like.

The communications network 100 may include Mobile Stations (MS) 110a, 110b . . . 110n (generally 110), a radio access network (RAN) 120, various networks 130 like the Internet. Although shown in this manner, the MSes, RANs, and various networks may be embodied in the form shown or other related forms, in singular and/or multiples.

Each of the MSes 110 may be a user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include base stations (BS) 140 connected to the MSes 110 to access each other or the networks 130. The BSes 140 may be a NodeB, Radio Network Controller (RNC), eNodeB, Base Station Controller (BSC), Base Transceiver Station (BTS), Base Station (BS), Transceiver Function (TF), Radio Router, Radio Transceiver, Basic Service Set (BSS), Extended Service Set (ESS), Radio Base Station (RBS), or some other terminology.

The base stations 140 may communicate with one or more of the MSes 110 over an interface 115 that may be a wireless communication link.

Figure 1B:
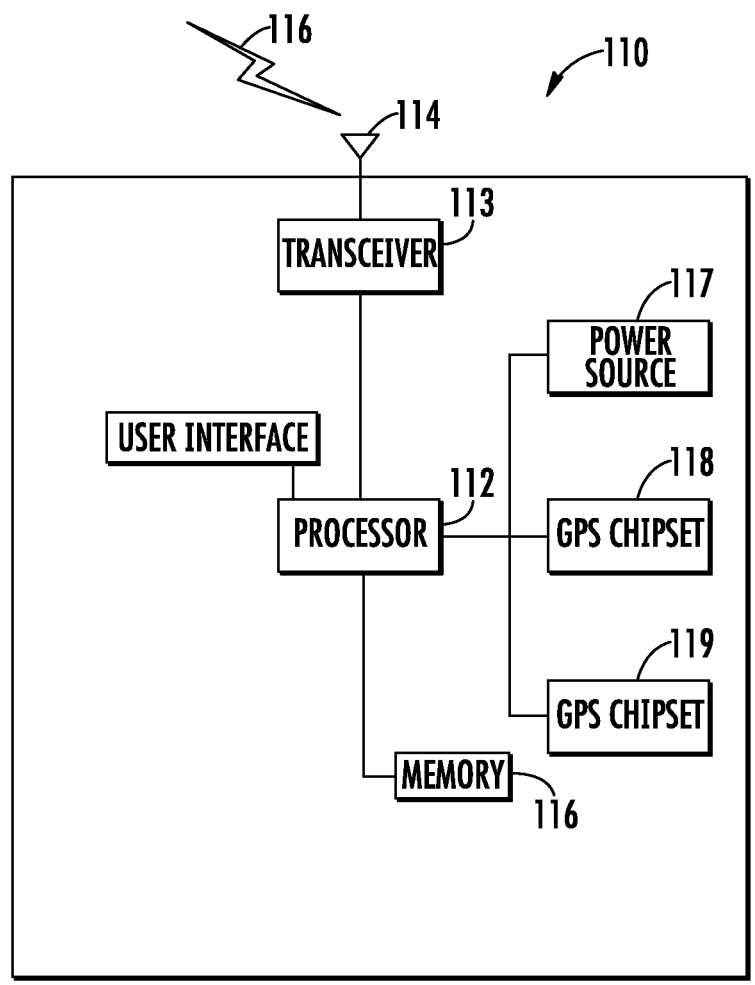

FIG. 1B is a system component of an example MS 110. The MS 110 may include a processor 112, a transmitter and receiver or transceiver 113, an antenna 114, a user interface 115, memory 121, a power source 117, a global positioning system (GPS) chipset 118, and other peripherals 119. The MS 110 may include some or all of these elements.

The processor 112 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 112 may perform signal coding, data processing, power control, input/output processing, and/or any other functionality that enables the MS 110 to operate in a wireless environment. The processor 112 may be coupled to the transceiver 113, which may be coupled to the antenna 114.

The antenna 114, which may be one or multiple elements, may be configured to transmit signals to, or receive signals from, a base station 140 over the air interface 116.

The transceiver 113 may be configured to modulate the signals that are to be transmitted by the antenna 114 and to demodulate the signals that are received by the antenna 114. The MS 110 may have multi-mode capabilities. Thus, the transceiver 113 may include multiple transceivers for enabling the MS 110 to communicate via multiple RATs.

The processor 112 may be coupled to the user interface 115, the transceiver 113, power source 117, GPS chipset 118, peripherals 119, and memory 116.

FIG. 1C is a system diagram of the RAN 104 and the core network 106 according to an embodiment. As noted above, the RAN 104 may employ an E-UTRA radio technology to communicate with the MSes 110a, 110b . . . 110n over the air interface 116. The RAN 104 may also be in communication with the core network 106.

B. Open Systems Interconnection Model

The Open Systems Interconnection model (OSI model) is a conceptual model that characterizes and standardizes the communication functions of a telecommunication or computing system without regard to its underlying internal structure and technology. Its goal is the interoperability of diverse communication systems with standard protocols. The model partitions a communication system into abstraction layers. The original version of the model defined seven layers:

Layer 1: Physical Layer. The Physical Layer conveys a bit stream through the network at the electrical and mechanical level. It provides the hardware means of sending and receiving data on a carrier, including defining cables, cards and physical aspects.

Layer 2: Data Link Layer. At the Data Link Layer, data packets are encoded and decoded into bits. It furnishes transmission protocol knowledge and management and handles errors in the physical layer, flow control and frame synchronization. The data link layer is divided into two sub layers: The Media Access Control (MAC) layer and the Logical Link Control (LLC) layer. The MAC sub layer controls how a computer on the network gains access to the data and permission to transmit it. The LLC layer controls frame synchronization, flow control and error checking.

Layer 3: Network Layer. The Network Layer provides switching and routing technologies, creating logical paths, known as virtual circuits, for transmitting data from node to node. Routing and forwarding are functions of this layer, as well as addressing, internetworking, error handling, congestion control and packet sequencing.

Layer 4: Transport Layer. The Transport Layer provides transparent transfer of data between end systems, or hosts, and is responsible for end-to-end error recovery and flow control. It ensures complete data transfer.

Layer 5: Session Layer. The Session Layer establishes, manages and terminates connections between applications. The session layer sets up, coordinates, and terminates conversations, exchanges, and dialogues between the applications at each end. It deals with session and connection coordination.

Layer 6: Presentation Layer. The Presentation Layer provides independence from differences in data representation (e.g., encryption) by translating from application to network format, and vice versa. The presentation layer works to transform data into the form that the application layer can accept. This layer formats and encrypts data to be sent across a network, providing freedom from compatibility problems. It is sometimes called the syntax layer.

Layer 7: Application Layer. The Application Layer supports application and end-user processes. Communication partners are identified, quality of service is identified, user authentication and privacy are considered, and any constraints on data syntax are identified. Everything at this layer is application-specific. This layer provides application services for file transfers, e-mail, and other network software services. Telnet and FTP are applications that exist entirely in the application level. Tiered application architectures are part of this layer.

A layer serves the layer above it and is served by the layer below it. For example, a layer that provides error-free communications across a network provides the path needed by applications above it, while it calls the next lower layer to send and receive packets that comprise the contents of that path. Two instances at the same layer are visualized as connected by a horizontal connection in that layer.

C. XOR Implementation

Figure 4:
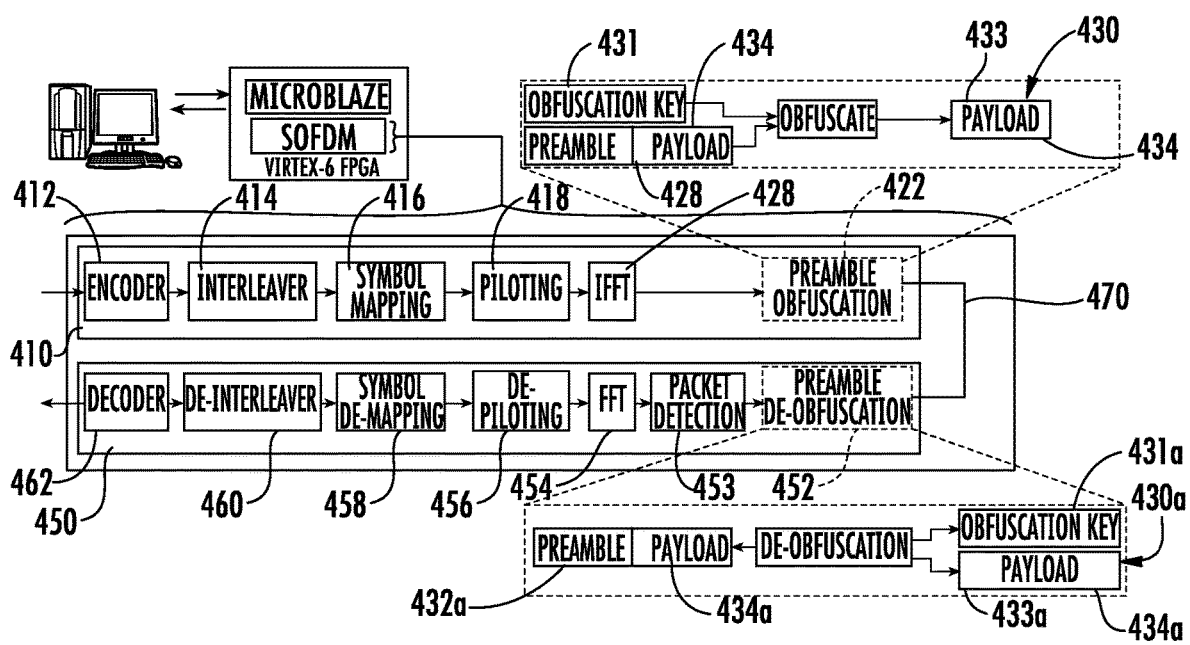
FIG. 4 shows a system layout of a SOFDM PHY layer.

As shown in FIG. 4 and described in more detail below, when sending signals between two MSes or an MS and BS, an MS or BS may assemble a packet 430 that includes a preamble 432 and a payload 434. The preamble 432 is a signal used in network communications to synchronize transmission timing between two or more systems. The payload 434 is the data to be transmitted.

Figure 2A:
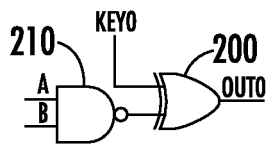
FIGS. 2A-2C show several encryption implementations.
Figure 2B:
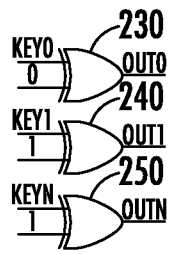

An XOR gate may be added between each bit and the final preamble bit output to allow for the translation of the standard based preamble to an encrypted preamble, is shown in FIG. 2B. As shown in FIG. 2B, each XOR gate 230, 240, 250 has two inputs, including a KEY0, KEY1 . . . KEYN as required and an output OUT0, OUT1 . . . OUTN.

If a bit requires flipping, the key with the corresponding bit is set to 1 to invert the input, allowing for the generation of any encrypted output sequence. XOR based encryption may be used as a means to preserve the original standards based preamble when the key is set to 0, which ensures communication is established if the pairing of the receiver and transmitter is unsuccessful with the encrypted preamble. The XOR methodology is also beneficial when the standard preamble is not known, or the design is meant to support multiple standards, as the preamble input need not be known for correct operation.

Figure 2C:
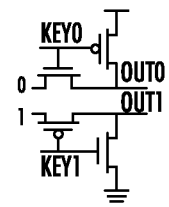
Figure 3:
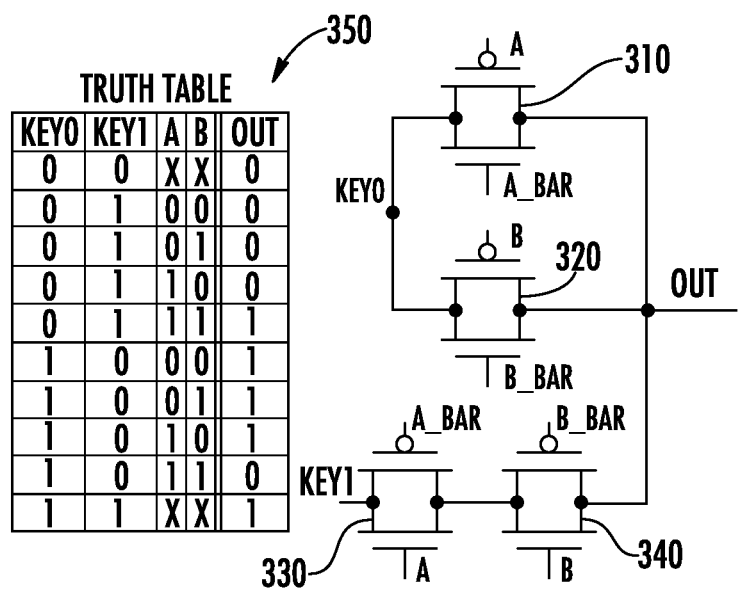
FIG. 3 shows a transcription gate encryption topology and related truth table.

FIG. 2C shows an ASIC implementation 260 to reduce the overhead cost. Since the original preamble bit is known, this ASIC implementation 260 provides the logic to flip the bit. The top portion 270 shows that if the preamble bit is 0, KEY0 can be set to 0 to tie OUT0 to VDD instead of logic low. Likewise, the bottom portion 280 shows that if the preamble bit is a 1, the KEY1 is set to 1 to connect OUT1 to GND. This may save the cost of some gates in the XOR gates or full memory based implementations.

While shown with an XOR or gate level logic encryption, the implementation may not be so-limited and in fact any reconfigurable logic may be used to create a series of bits to represent the preamble. Memory elements, multiplexers, and other logic may be used in the system, as long as it creates a new preamble based on the physical channel key.

D. Synchronization

The inherent repetitive structure of the preamble is maintained for synchronization since auto-correlation based techniques are required for both coarse timing and frequency estimates. Even if an attacker is able to determine the coarse timing point of the signal through standard auto-correlation methods, cross-correlation based fine timing synchronization may fail as the receiver is using the incorrect reference signal.

If timing synchronization is not resolved by the attacker, the packet may be rendered useless. Encrypting the reference symbol that is used for channel estimation causes an incorrect channel estimate at each sub-carrier, which results in the corruption of the packet. Although an attacker with infinite processing time is capable of determining the correct estimates through iterative minimization approaches of the recovered Error Vector Magnitude, the methods may be impractical under real-time constraints.

Experimental Setup and Implementation

A preamble obfuscation technique may be implemented and validated on a hardware-based software-defined radio to permit the development of the design with gate level logic. A Software Defined Communication (SDC) testbed may be a highly flexible hardware based physical layer implementation for Scalable Orthogonal Frequency Division Multiplexing (S-OFDM) signals, allowing for rapid prototyping for wireless research.

An 802.11-2012 experimental setup used the Wireless Open-Access Research Platform (WARP) designed to collect wireless channel fingerprints. The measurements used interrupt based sampling and piggy-backed on standard WiFi packets to enable standards-compliant transmissions. The symmetric keys generated by the above algorithm were then used for preamble obfuscation as described in the next section, which is done in two phases. In Phase 1 of the model, realization of the preamble obfuscation technique as a proof of concept in a higher level language is achieved. MATLAB was used to create an ODFDM-based packet with an obfuscated preamble and known data within the payload. The packet with its obfuscated preamble was then transmitted over WARPLab to introduce channel affects and received back into the MATLAB workspace.

The inability of software scripts to decode the transmitted payload with an obfuscated preamble validated the efficacy of the preamble obfuscation technique. The complexity introduced avoided implementing gate level obfuscation using one of the techniques described earlier with MATLAB.

In Phase 2, gate level obfuscation was implemented within the physical layer of the SDC testbed. Every module comprising the SOFDM core within the SDC testbed may be built to be insensitive to functional latencies occurring across other baseband modules. Therefore, the extra processing latency introduced by the obfuscation module implemented between the ifft module and the transmit buffers in the transmitter did not interfere with the physical layer implementation. In addition, the global configuration control of SDC through the on-board microblaze processor enabled changing keys on demand if required.

In order to develop and study gate level logic implementations, it was essential to include debug probe locations into the hardware modules targeted for the obfuscation. The simulation framework of SDC built in MATLAB sysGen has embedded probe locations used to transmit and receive packets through an emulated channel. For the work developed herein, the output from the fine packet detection modules that were probed. As the first step, a packet was transmitted and received without the added obfuscation to provide a reference of captured data from the fine packet detection.

The experimental setup with the added preamble obfuscation and de-obfuscation modules at, respectively, the transmitter and receiver.

FIG. 4 shows a system layout used in the experiment, but that also generally shows the system and method described herein at a transmitter and receiver. In the experiment and practice, there may be a transmitter 410 and receiver 450, which may be any device but commonly a MS. The transmitter 410 may include an encoder 412 that encodes a signal to be sent, an interleaver 414 to reduce error, a symbol mapper 416 to package the data payload, a pilot insertion module 418 that prepares a pilot code that it adds to a payload signal, an inverse fast fourier transform ifft 420, and a preamble obfuscation 422 in which the XOR gate obfuscation described herein takes place.

The receiver 450 has the similar elements including a preamble de-obfuscator, 452, packet detector 453 to detect the packet, FFT 454, de-pilot 456, symbol de-mapper 458, de-interleaver 460, an decoder 462, which in turn work to deliver the transmitted signal 470 to an end user.

The obfuscation module 422 in the transmitter 410 may be added between the ifft 420 and the front-end buffer, while the de-obfuscation module 452 may be added between the front-end buffer and packet detection module 453 at the receiver 450.

The obfuscation module 422 comprises control circuits that encrypt the preamble data section 432 of a transmitted packet 430 while leaving the payload 434 in the original form to create a combined encrypted packet 430 from an unencrypted packet 428. By combining the unencrypted packet 428 with an obfuscation key 431 through the obfuscation module 422, the transmitter 410 creates an obfuscated preamble/payload packet 430 that is the combination of an obfuscated preamble 433 and packet 434.

The control is capable of differentiating the preamble from the payload using the packet control handles of SDC provided within the modules. The de-obfuscation module 452 acts similarly in reverse as the obfuscation module 422 to combine the obfuscation key 431a at the receiver 450 with the packet 430a (preamble 433a and packet 434a) at the receiver 450 to yield the deobfuscated preamble/payload packet 434a that mirrors the transmitted packet 428 that is a preamble 432a and payload 434a.

The obfuscation keys 431, 431a are stored in a shared memory 121 accessible to the on board microprocessor 112, which enables setting and changing the key at run time and change on-demand if needed. This framework ensures that the transmitter 410 started communication exchanges with any receiver 450 using the same protocol. If both the transmitter 410 and receiver 450 have the obfuscation functionality, the physical channel will be used to generate a key and that key will be used to encrypt the preamble.

In phase 2, the unique key that independently generated at both the transmitter 410 and the receiver 450 using the technique described in above was loaded into the shared registers. On the transmitter side 410, the obfuscation register is used to encrypt the preamble, while decryption occurred at the receiver 450.

Results and Analysis

The captured data from the fine packet detection module was used for verification of the implementation.

The results observed at the output of the cross correlation module of the receiver are discussed in this section. The cross correlation module was used for timing synchronization of the received packet. The ability to decrypt the preamble back to the original form plays an important role in enabling corrective modules to act on the received signal which otherwise renders the received packet useless. The effects of the encrypted preamble for blocks past the cross correlation are not discussed herein.

Figures 5A, 5B, 5C:
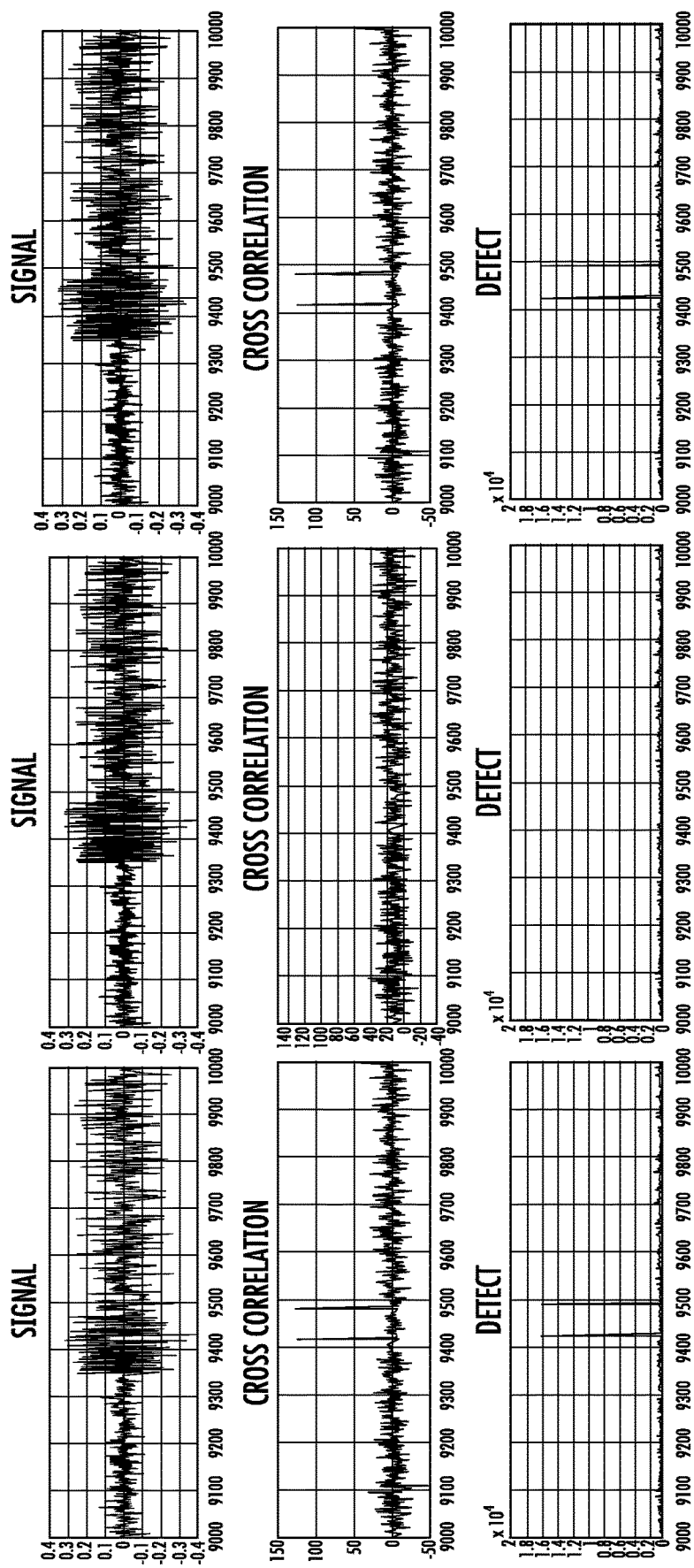
FIGS. 5(a)-5(c) show received signal, cross-correlation, and fine detect outputs captured at the receiver.

The top subplot in FIG. 5(a) is the signal captured at the receiver without the added physical key obfuscation of the preamble at the transmitter or the de-obfuscation at the receiver. The received signal is then cross correlated with the known preamble to detect the fine start of the packet. The output of the cross correlation of the captured signal is shown in the middle subplot of FIG. 5(a) and the two peaks in the bottom subplot of FIG. 5(a) represent positive detection as the threshold of 10e4 is passed, which was the set value for this experiment. The use of preamble obfuscation at the transmitter renders the fine packet detection incapable of detecting the fine packet start, which corresponds to the absence of peaks in the output of the cross correlation (See FIG. 5(b)). The application of the physical key at the receiver enables the fine packet detection, as is shown by the cross correlation results of FIG. 5(c). The results indicate that encryption and decryption of the communication link is feasible through obfuscation of the preamble.

Generating the key (keyobj), to obfuscate the preamble is a function of the spectrum reciprocity key (keychn). The function that derives keyobj from keychn, in its current implementation, randomly selects a subset of length determined by the preamble length. Additional work involves developing the function to only choose the keyobj subsets that preserve certain preamble characteristics essential for decoding with respect to the noisy/fading channels. The current function channel pair worked for all key subsets that were iterated through.

Conclusion

The results indicate that encryption schemes integrated into the wireless physical layer permits logic gate based packet detection obfuscation. Our technique uses wireless channel fingerprints to extract symmetric secret keys on both ends of the communication channel. The keys were then used to successfully encrypt the packet preamble. By leveraging the SDC testbed, it was shown that an intruder without the correct decryption key is unable to detect the wireless packet using standard wireless packet detectors.

While the invention has been described with reference to the embodiments above, a person of ordinary skill in the art would understand that various changes or modifications may be made thereto without departing from the scope of the claims.

The invention claimed is:

1. A communications network comprising a transmitting mobile station that transmits a packet, the communications network comprising:
   a payload to be transmitted;
   an obfuscation module comprising a control circuit that encrypts a preamble at a physical layer with a first obfuscation key to create an obfuscated preamble;
   a first antenna that transmits the packet comprising the payload and the obfuscated preamble; and
   a receiving mobile station comprising:
   a second antenna that receives the transmitted packet; and
   a de-obfuscation module comprising a control circuit that decrypts the obfuscated preamble using a second obfuscation key to create a de-obfuscated preamble, wherein the first obfuscation key and the second obfuscation key are generated at the transmitting mobile station and the receiving mobile station, respectively, based on reciprocal channel characteristics.

2. The communications network of claim 1, wherein the obfuscation module is in the transmitting mobile station physical layer.

3. The communications network of claim 1, wherein the transmitting mobile station further comprises a memory, and wherein the first obfuscation key is stored in the memory.

4. The communications network of claim 1, wherein a control differentiates the preamble from the payload using packet control handles.

5. The communications network of claim 3, wherein the memory is a shared memory which is shared between the transmitting mobile station and a receiving mobile station that receives the transmitted packet.

6. The communications network of claim 5, wherein the first obfuscation key and a second obfuscation key, generated at the transmitting mobile station and a receiving mobile station respectively, are stored in the shared memory.

7. The communications network of claim 6, wherein the shared memory enables setting the first obfuscation key and the second obfuscation key at run time and/or change on-demand.

8. The communications network of claim 1, wherein the preamble is obfuscated based on a gate level obfuscation implemented within the physical layer.

9. The communications network of claim 1, wherein the first obfuscation key is generated based on a spectrum reciprocity key.

10. The communications network of claim 1, wherein the obfuscation module obfuscates the preamble such that an inherent repetitive structure of the preamble is maintained.

11. An integrated circuit for secure wireless communications comprising an obfuscation module comprising a control circuit that obfuscates a preamble at a physical layer using obfuscation keys that are generated at a first node and a second node based on reciprocal channel characteristics, wherein the obfuscation module encrypts the preamble of a transmitted packet while leaving a payload in an original form, wherein the obfuscation keys are unique and independently generated, based on the reciprocal channel characteristics, at the first node and the second node.

12. The integrated circuit of claim 11, wherein the first node is a transmitter and the second node is a receiver, and wherein the transmitter obfuscates the preamble and the receiver de-obfuscates the obfuscated preamble.

13. The integrated circuit of claim 11, wherein the obfuscation module is in a circuit physical layer.

14. The integrated circuit of claim 11, wherein the integrated circuit further comprises a memory and the obfuscation keys are stored in the memory.

15. The integrated circuit of claim 11, wherein a control differentiates the preamble from a payload using packet control handles.

* * * * *